United States Patent [19]

Bourgeois et al.

[11] Patent Number: 4,671,947

[45] Date of Patent: * Jun. 9, 1987

[54] NOVEL SODIUM ORTHOPHOSPHATE

[75] Inventors: Jean-Paul Bourgeois, Creteil; Frederic Couffin, Montgeron; Claude Magnier, Paris, all of France

[73] Assignee: Rhone-Poulenc Industries, Paris, France

[*] Notice: The portion of the term of this patent subsequent to Jun. 9, 2004 has been disclaimed.

[21] Appl. No.: 813,994

[22] Filed: Dec. 27, 1985

Related U.S. Application Data

[63] Continuation of Ser. No. 721,426, Apr. 9, 1985, abandoned, which is a continuation of Ser. No. 637,790, Aug. 6, 1984, abandoned, which is a continuation of Ser. No. 395,600, Jul. 6, 1982, abandoned.

[30] Foreign Application Priority Data

Jul. 6, 1981 [FR] France ................................ 81 13223

[51] Int. Cl.$^4$ ........................ C01B 15/16; C01B 25/26

[52] U.S. Cl. .................................... 423/308; 423/305; 423/307; 159/48.1

[58] Field of Search ............... 423/305, 307, 308, 312, 423/313, 314, 315; 23/293 A, 313 R; 159/48.1

[56] References Cited

U.S. PATENT DOCUMENTS 3,647,369 3/1972 Riehm ................................. 423/312
4,265,702 5/1981 Prudhon et al. .................... 159/48.1

FOREIGN PATENT DOCUMENTS 799429 8/1958 United Kingdom ................ 423/315

Primary Examiner—Gregory A. Heller
Attorney, Agent, or Firm—Burns, Doane, Swecker & Mathis

[57] ABSTRACT

A novel sodium orthophosphate has the formula $Na_5H_4(PO_4)_3$ wherein the Na/P ratio thereof is essentially 5/3, and which is characterized by but a single crystalline phase and a characteristic X-ray diffraction pattern.

3 Claims, 1 Drawing Figure

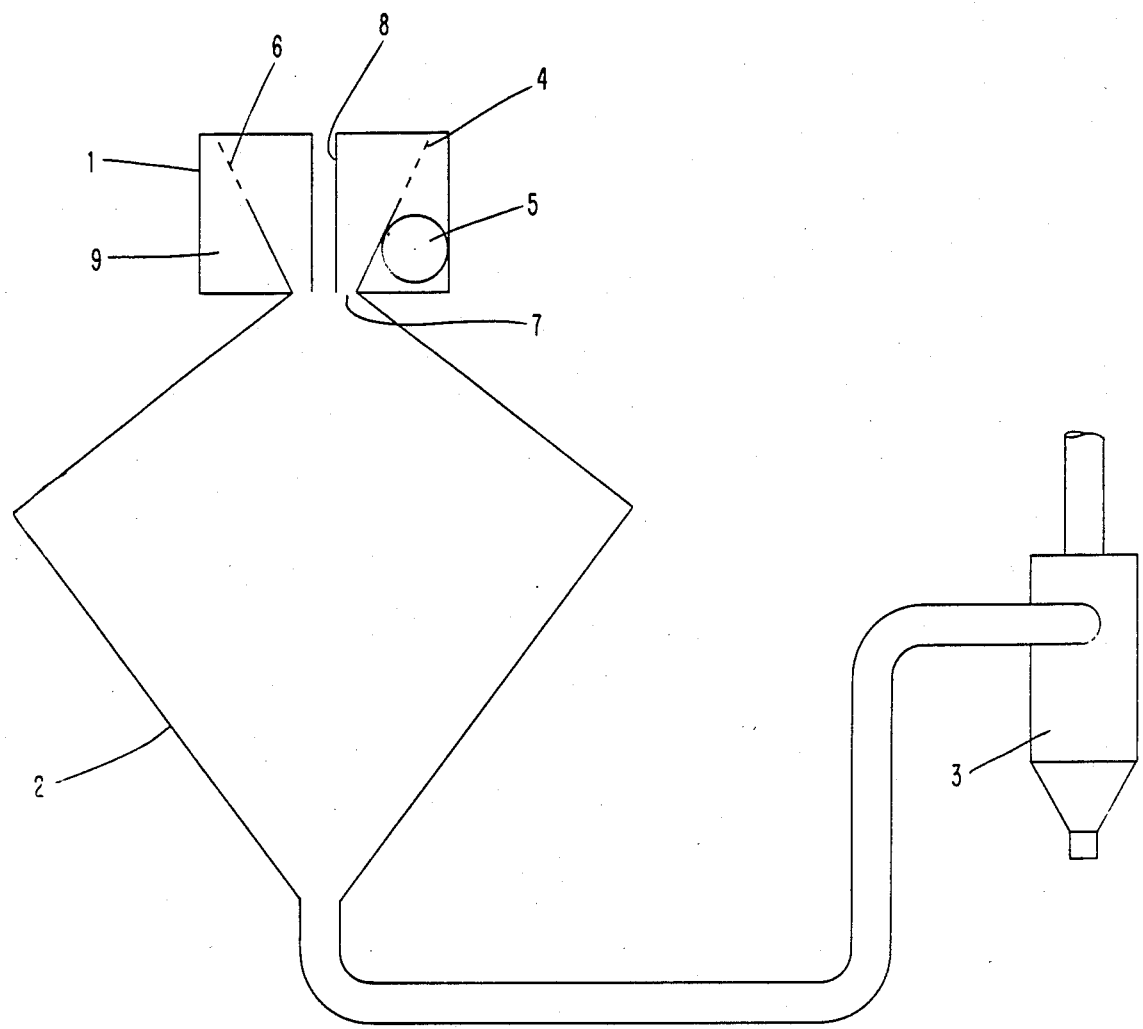

NOVEL SODIUM ORTHOPHOSPHATE

This application is a continuation of application Ser. No. 721,426, filed Apr. 9, 1985, which is a continuation of Ser. No. 637,790 filed Aug. 6, 1984, which is a continuation of Ser. No. 395,600 filed July 6, 1982 all now abandoned.

BACKGROUND OF THE INVENTION

1. Field of the Invention

The present invention relates to a novel sodium orthophosphate, and to a process for the preparation thereof.

2. Description of the Prior Art

It is known to this art to prepare sodium tripolyphosphate by drying a solution of orthophosphates containing approximately 5 moles of $Na_2O$ per every 3 moles of $P_2O_5$.

It too is known to this art that the solid orthophosphates obtained as precursors of TPP, $Na_5P_3O_{10}$, whether prepared in rotating or spray dryer, are respectively constituted of more or less intimate admixtures, either of $NaH_2PO_4$ and $Na_2HPO_4$ or of $Na_3H_3(PO_4)_2$ and $Na_2HPO_4$.

Also in accordance with the known processes, calcination of these admixtures of orthophosphates results in various pyrophosphates ($Na_2H_2P_2O_7+Na_4P_2O_7$) or ($Na_3HP_2O_7+Na_4P_2O_7$) in crystalline or amorphous form. The TPP is then obtained by thermocondensation of the admixtures of pyrophosphates. It is therefore clearly apparent that the phosphate impurities which typically accompany the TPP tetrasodium pyrophosphate soluble or insoluble polyphosphates) result from segregation of orthophosphates or pyrophosphates, and are inexorably linked to the particular process employed.

In any event, whatever the particular process employed, the mixture obtained after drying invariably consists of two crystalline entities which are well known and reflected in the $Na_2O/P_2O_5/H_2O$ equilibrium diagram. Compare also British Patent Specification No. 1,277,067.

SUMMARY OF THE INVENTION

Accordingly, a major object of the present invention is the provision of novel sodium orthophosphate, having but a single crystalline phase and having an Na/P ratio of essentially 5/3.

BRIEF DESCRIPTION OF THE DRAWING

The FIGURE of Drawing is a schematic/diagrammatic illustration of a phase contactor/separator suitable for carrying out the process according to the invention.

DETAILED DESCRIPTION OF THE INVENTION

More particularly according to the present invention, the subject novel sodium orthophosphate has the following formula:

$$Na_5H_4(PO_4)_3$$

Its X-ray diffraction pattern is as follows, measured by diffractometry through reflection:

| Line no. | dÅ |
|---|---|
| 1 | 8.9 |
| 2 | 5.35 |
| 3 | 4.68 |
| 4 | 4.63 |
| 5 | 3.85 |
| 6 | 3.81 |
| 7 | 3.75 |
| 8 | 3.67 |
| 9 | 3.66 |
| 10 | 3.63 |
| 11 | 3.33 |
| 12 | 3.28 |
| 13 | 3.15 |
| 14 | 2.77 |
| 15 | 2.72 |
| 16 | 2.71 |
| 17 | 2.68 |
| 18 | 2.64 |
| 19 | 2.54 |

Also in accordance with the present invention, the subject sodium orthophosphate is conveniently prepared by the process comprising:

(i) formulating an aqueous solution of monosodium and disodium orthophosphates, such that the overall Na/P ratio is essentially equal to $1.667\pm0.01$;

(ii) establishing in suitable apparatus a vertically descending current of axially extending, axially symmetrical helical flow of a hot gaseous phase, e.g. hot air;

(iii) separately establishing therein a second phase liquid current of coaxially downwardly vertically extending, rectilinear continuous jet stream of the aqueous orthophosphate solution formulated under (i) above;

(iv) maintaining said currents of said first hot gaseous and said second liquid orthophosphate phases physically separate from each other;

(v) circulating and directing said currents which comprise the respective plural phases to a zone of restricted flow passage with respect to said helical flow;

(vi) at said zone of restricted flow passage, converging and intimately, homogeneously admixing said plural currents, and atomizing into a multitude of droplets, and entraining/dispersing and crystallizing said rectilinear jet stream liquid orthophosphate current within said helical spinning current of hot gas.

In operation, at the zone of convergence of the respective phases the first phase helical flow of hot gas is such that the momentum thereof is at least 100 times greater, and preferably from 1,000 to 10,000 times greater, than the momentum of the second phase, coaxial rectilinear flow of the orthophosphate solution being crystallized.

Also, the flow of the orthophosphate solution is at relatively low velocity, e.g., less than about 10 m/sec, and the hot gas stream is under relatively low pressure, e.g. less than about $10^5$ Pa.

Too, the temperature profile of the crystallization reaction is controlled by the hot gaseous phase.

Also in operation, there is concurrently established within the apparatus a flow defining a layered horizontal stack of a plurality of hyperboloids by means of the trajectory of the helical current of hot gaseous flow, which, at a point downstream from said zone of restricted flow passage coestablishes a zone of narrower width than said zone of restricted flow passage. Thus, the helical flow of hot gas and the rectilinear stream of the orthophosphate solution in reality define three successive zones of intimate contact according to the invention, such zones serially succeeding each other in the absence of any discontinuity, and in the following order:

(1) a very short zone of dispersion;
(2) a zone in which the volumetric components of the hot gas and the droplets of the orthophosphate solution form gas/liquid couples along trajectories established by the hot gas and in essentially piston-like or plug flow; and
(3) an isothermal zone.

Moreover, consistent herewith all of the heat exchange between the respective phases and for crystallization must be effected in the zone 2. And for such purpose, the temperature in the zone 3 has to be relatively low, on the order of from 100° to 160° C., and preferably from 120° to 130° C.

Contrariwise, the feed temperature of inlet of the hot gas must be relatively high, since all of the water has to be removed/vaporized from the orthophosphate solution in the zone 2. The choice of the particular temperature selected of course depends upon the several operating parameters of the subject process, but same should be several hundreds of degrees higher than the temperature existing in the isothermal zone 3, and advantageously is 400° to 600° C. higher than the temperature of the isothermal zone 3 under normal operating conditions.

A homogeneous distribution of the droplets formed from the orthophosphate solution is conveniently effected by conducting the operation as above described. Further, the thermodynamics of the system are such that any competing or parasitic evolving of necessary materials is prevented, and the composition of the solids in the system remains identical to that of the liquid at the point of crystallization, a result quite surprising and unexpected.

For a more detailed description of apparatus and certain methodology for carrying out the process according to the invention, compare French Pat. Nos. 2,257,326 (corresponding to U.S. Ser. No. 916,477, filed June 19, 1978) and U.S. Pat. No. 2,419,754 (corresponding to British Patent Specification No. 2,017,523), and U.S. Pat. No. 4,257,339. Cf U.S. Pat. Nos. 4,124,353, 4,263,234, 4,265,702 and 4,267,131, published European Patent Application No. 0,007,846, and published French Application Nos. 80/17960 and 80/20464, all assigned to the assignee hereof.*

*Detailed description of the process according to the invention however is set forth in the aforenoted copending application, attorney docket No. 022700-207.

Referring specifically to the FIGURE of Drawing, suitable apparatus for carrying out the process according to the invention comprises a phase contactor/separator consisting essentially of a dispersing "head" 1, a double-cone treatment vessel 2, and a cyclone separator 3.

The head 1 comprises an inverted, truncated and upwardly perforated cone 4 downwardly depending from a cylindrical casing member and defining an annular space 9. Coaxial therewith is an internal tubular conduit or inlet pipe 8 for the orthophosphate solution feedstream, the same coaxially extending through the upside end of the casing member and deep within the truncated cone 4, said truncated cone 4 terminating in an outlet 7 or confining zone of restricted flow passage. The perforations 6 enable the establishment of a regularly repeating, helical path of axially extending downward flow which is essentially symmetrical with respect to at least one plane passing through the axis of the helical flow, such flow being established by means of the helical trajectory inducing tangential inlet 5 for the hot gaseous phase. The wall member comprising the treatment vessel 2 is integral with the outlet 7.

It will be seen that the orthophosphate solution is fed through the conduit 8 into the low pressure zone of the helical flow of hot gas, i.e., into the upstream end of the double-cone treatment vessel 2.

In order to further illustrate the present invention and the advantages thereof, the following specific example is given, it being understood that same is intended only as illustrative and in nowise limitative.

EXAMPLE

Into the apparatus shown in the FIGURE of Drawing, a feedstream solution containing 15.8% of $P_2O_5$ and 11.5% of $Na_2O$ (Na/P=1.667) and maintained at 40° C. was introduced, through the feed conduit 8, at a flow rate of 10 liters/hour, into hot air (T=640° C.; 50 Nm3/h) where it was dried instantaneously. The temperature at the zone of convergence at which the gas and solids merge was 145° C. Chromatographic analysis evidenced that only orthophosphate was present, and X-ray and infra-red spectra demonstrated that the crystalline phase was never a mixture of two phases, such as $NaH_2PO_4$ and $Na_3H_3(PO_4)_2$. The Na/P ratio measured by potentiometry was 1.663. The novel orthophosphate can thus be assigned the formula $Na_5H_4(PO_4)_3$. The Table below reflects a list of the reticular distances and line intensities obtained by diffractometry (Siemens Generator K 805, monochromatic radiation CuKa. Proportional counter); same enable characterization of the final product without any ambiguity:

| Line no. | dÅ | Estimated intensities |
|---|---|---|
| 1 | 8.9 | vvl |
| 2 | 5.35 | vl |
| 3 | 4.68 | l |
| 4 | 4.63 | l |
| 5 | 3.85 | a |
| 6 | 3.81 | fl |
| 7 | 3.75 | a |
| 8 | 3.67 | fh |
| 9 | 3.66 | a |
| 10 | 3.63 | a |
| 11 | 3.33 | vl |
| 12 | 3.28 | fl |
| 13 | 3.15 | vl |
| 14 | 2.77 | h |
| 15 | 2.72 | fh |
| 16 | 2.71 | a |
| 17 | 2.68 | fh |
| 18 | 2.64 | vh |
| 19 | 2.54 | l |

N.B.
vh: very high intensity
h: high intensity
fh: fairly high intensity
a: average intensity
fl: fairly low intensity
l: low intensity
vl: very low intensity
vvl: very very low intensity While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. Sodium orthophosphate, having the formula $Na_5H_4(PO_4)_3$ wherein the Na/P ratio thereof is essentially 5/3, and being characterized by but a single crystalline phase having an X-ray diffaction pattern substantially as follows:

| Line No. | dÅ |
|---|---|
| 1 | 8.9 |
| 2 | 5.35 |
| 3 | 4.68 |
| 4 | 4.63 |
| 5 | 3.85 |
| 6 | 3.81 |
| 7 | 3.75 |
| 8 | 3.67 |
| 9 | 3.66 |
| 10 | 3.63 |
| 11 | 3.33 |
| 12 | 3.28 |
| 13 | 3.15 |
| 14 | 2.77 |
| 15 | 2.72 |
| 16 | 2.71 |
| 17 | 2.68 |
| 18 | 2.64 |
| 19 | 2.54 |

2. A process for the preparation of the sodium orthophosphate as defined by claim 1, comprising:
   (i) formulating an aqueous solution of monosodium and disodium orthophosphates, such that the overall Na/P ratio thereof is essentially 1.667±0.01;
   (ii) establishing a vertically descending current of axially extending, axially symmetrical helical flow of a hot gaseous phase;
   (iii) separately establishing a second phase liquid current of coaxially downwardly vertically extending, rectilinear continuous jet stream of the aqueous orthophosphate solution formulated under (i) above having a velocity less than 10 m/sec and a pressure of less than $10^5$ Pa;
   (iv) maintaining said currents of said first hot gaseous and said second liquid orthophosphate phases physically separate from each other;
   (v) circulating and directing said currents which comprise the respective plural phases to a zone of restricted flow passage with respect to said helical flow;
   (vi) at said zone of restricted flow passage, converging and intimately, homogeneously admixing said plural currents, and atomizing into a multitude of droplets, and entraining/dispersing and crystallizing said rectilinear jet stream liquid orthophosphate current within said helical spinning current of hot gas; and
   (vii) at the zone of convergence of the respective phases the first phase helical flow of hot gas is such that the momentum thereof is at least 100 times greater than the momentum of the second phase, coaxial rectilinear flow of the orthophosphate solution being crystallized,
   (vii) recovering said crystallized sodium orthophosphate, wherein the temperature of the feed gas is 400° to 600° C. higher than the temperature of the gas upon completion of the crystallization of the orthophosphate solution, the temperature upon such completion being from 100° to 160° C.

3. The process as defined by claim 2, wherein the step (vii) said momentum of the hot gas is from 1,000 to 10,000 times greater than the momentum of the orthophosphate phase.

* * * * *